(12) United States Patent
Hill

(10) Patent No.: US 6,278,605 B1
(45) Date of Patent: Aug. 21, 2001

(54) MODULAR CIRCUIT BREAKER INTERCONNECTION SYSTEM

(75) Inventor: Roland Baridon Hill, Sandton (ZA)

(73) Assignee: Circuit Breaker Industries Limited, Elandsfontein (ZA)

( * ) Notice: Subject to any disclaimer, the term of this patent is extended or adjusted under 35 U.S.C. 154(b) by 0 days.

(21) Appl. No.: 09/180,523

(22) PCT Filed: May 12, 1997

(86) PCT No.: PCT/GB97/01293

§ 371 Date: Jan. 8, 1999

§ 102(e) Date: Jan. 8, 1999

(87) PCT Pub. No.: WO97/43810

PCT Pub. Date: Nov. 20, 1997

(30) Foreign Application Priority Data

May 10, 1996 (ZA) .................................... 96/3736

(51) Int. Cl.[7] .................. H02B 1/00; H02B 1/20; H05K 7/00
(52) U.S. Cl. .................. 361/600; 200/307; 335/18; 361/656; 361/733; 361/735; 361/744
(58) Field of Search .................. 200/307; 335/18, 335/202; 361/600, 656, 679, 731–735, 740, 744, 790

(56) References Cited

U.S. PATENT DOCUMENTS

| | | | |
|---|---|---|---|
| 4,568,899 | * | 2/1986 | May et al. ............................ 335/18 |
| 4,858,056 | | 8/1989 | Russell . |
| 4,937,706 | * | 6/1990 | Schueller et al. .................... 361/744 |
| 5,001,315 | | 3/1991 | Runyan et al. . |
| 5,483,212 | * | 1/1996 | Lankuttis et al. ................... 335/202 |

FOREIGN PATENT DOCUMENTS

| | | |
|---|---|---|
| 295 03 285 U | 5/1996 | (DE) . |
| 0 514 295 | 11/1992 | (EP) . |
| 0 534 538 | 3/1993 | (EP) . |
| 2 016 632 | 9/1979 | (GB) . |
| WO92/10016 | 6/1992 | (WO) . |
| WO93/07597 | 4/1993 | (WO) . |

* cited by examiner

Primary Examiner—Gregory Thompson
(74) Attorney, Agent, or Firm—Burns, Doane, Swecker & Mathis, LLP

(57) ABSTRACT

A modular circuit breaker system includes a plurality of modules mounted side-by-side. The modules include electrical terminals for connection to live and neutral conductors of an electrical supply. Rigid metallic conductors extend between the modules for connecting electrical circuitry of one module to the electrical circuitry of the other module. Each conductor is removably engaged with electrical contacts mounted within the respective modules.

13 Claims, 4 Drawing Sheets

MODULAR CIRCUIT BREAKER INTERCONNECTION SYSTEM

BACKGROUND OF THE INVENTION

THIS invention relates to a modular circuit breaker system comprising a plurality of inter-connectable modules, and to the modules themselves.

The use of conventional circuit breakers is increasingly being supplemented by specialised modules which can be mounted on a conventional mounting rail of an electrical distribution board. For example, earth leakage sensors, energy measurement modules and various other functional modules can be provided in miniature circuit breaker housings.

It is an object of the invention to provide a modular system which incorporates circuit breakers and other components.

SUMMARY OF THE INVENTION

According to the invention there is provided a modular circuit breaker system comprising at least first and second modules adapted for mounting side by side, at least one of the first and second modules including electrical terminals for connection to live and neutral conductors of an electrical supply; and at least one electrical conductor extending between the modules and arranged to connect electrical or electronic circuitry of one module to electrical or electronic circuitry of the other module.

Preferably, at least one of the modules includes a circuit breaker or other switching means.

Each module may comprise a housing adapted to be mounted on a rail or other mounting means adjacent to other modules.

In a preferred embodiment of the invention, each module has a housing with generally planar sides which abut the sides of adjacent modules in use, the at least one electrical conductor extending transversely through respective apertures in the abutting sides of adjacent modules.

The at least one electrical conductor preferably comprises a rigid metallic conductor connected removably to electrical contact means in each respective module.

In the preferred embodiment, the conductor comprises a threaded metal rod having a first end which can be screwed into a complementally threaded contact receptacle in a first module.

At least one second module preferably includes a contact defining an aperture through which a second end of the threaded rod can extend in use, the rod being maintained in electrical contact with the contact by a fastener screwed onto the second end of the rod.

For example, the contact may comprise a conductive pad having an aperture extending therethrough, the fastener comprising a nut bearing against the pad in use to connect the rod physically and electrically thereto.

The nut is preferably long enough to receive a first end of a further conductor, which can be screwed into the nut.

The system may comprises a plurality of different second modules connectable side by side in the above manner.

The system preferably includes a third module which serves to cover the exposed side of the last of the adjacent second modules.

The system may comprise a base module which includes a first communication circuit, and at least one further module comprising a second communication circuit, the first and second communication circuits communicating with one another in use via the at least one electrical conductor extending between the modules.

The base module may include a circuit breaker, and a control circuit operable to open at least one set of contacts of the circuit breaker.

The at least one further module may be arranged to transmit a switch signal to the base module, the control circuit of the base module being responsive to the trip signal to operate the circuit breaker.

In a typical embodiment, the system comprises first and second electrical conductors extending between the modules, the first conductor serving as a common or reference conductor and the second conductor serving as a signal conductor.

The invention includes a module for use in a modular circuit breaker system comprising at least first and second modules mounted side by side and wherein at least one of the first and second modules includes electrical terminals for connection to live and neutral conductors of an electrical supply, the module comprising a housing adapted to be mounted on a rail or other mounting means adjacent to at least one other module; an electrical or electronic circuit adapted for connection to an electrical or electronic circuit of said at least one other module; and electrical contact means for receiving at least one electrical conductor which connects the module to said at least one other module in use.

DESCRIPTION OF EMBODIMENTS

Figure 1:
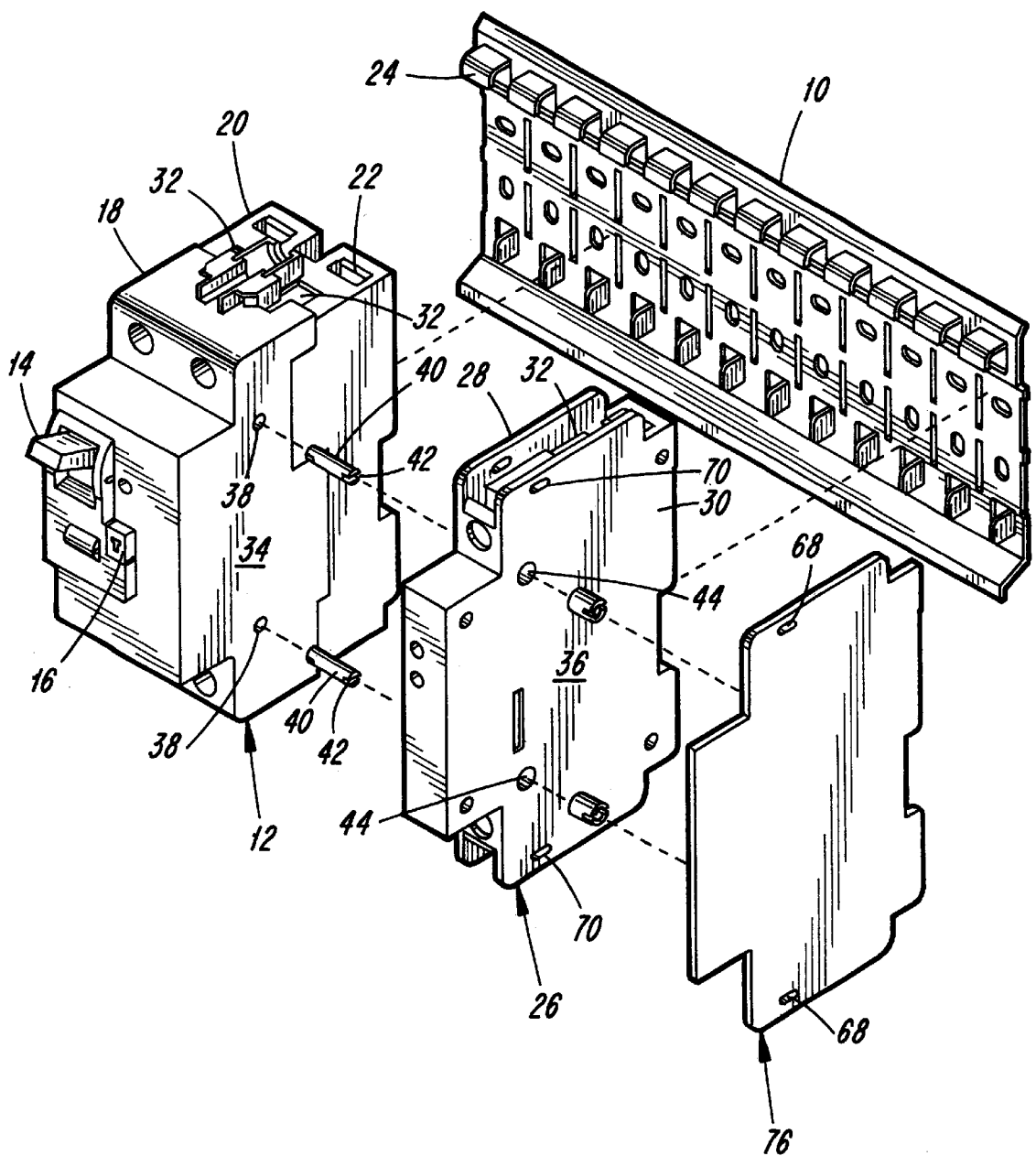
FIG. 1 is an exploded pictorial view showing a plurality of different modules according to the invention.

In FIG. 1, three different modules forming part of a modular circuit breaker system of the invention are shown adjacent a Minirail (trade mark) mounting rail 10.

The first module 12 is a base or "start" module and comprises a moulded plastics housing containing an earth leakage circuit breaker with an operating handle 14 and a test button 16 on its front face. The housing of the module 12 is formed in front and rear halves 18 and 20 which are moulded from a plastics material having suitable mechanical and dielectric properties. The rear half 20 of the housing has formations 22 formed in it which engage clips 24 on the Minirail 10 in a known manner.

Adjacent to the first module 12 is a second, "intermediate" module 26 which has the same profile as that of the module 12, viewed from the side, but which is one third its width and which is mounted on a single clip 24 of the rail 10, instead of a pair of clips as in the case of the triple-width housing of the module 12. The second module 26 has a housing which comprises left and right halves 28 and 30, rather than front and rear halves 18 and 20 as in the case of the module 12.

Both of the modules 12 and 26 have electrical terminals, i.e., line terminals 32 and load terminals 56 on their upper and lower surfaces, respectively. For example, in the case of the circuit breaker module 12, its load terminals 56 are provided on the bottom surface of the housing, while its line terminals 32 are provided on the upper surface.

Both the modules 12 and 26 have substantially flat side surfaces 34 and 36, respectively, allowing the modules to be mounted side by side on the mounting rail 10 with their adjacent side surfaces in abutment.

Instead of a Minirail mounting rail, a DIN mounting rail or another mounting means can be used to mount the modules within an enclosure.

Figure 3:
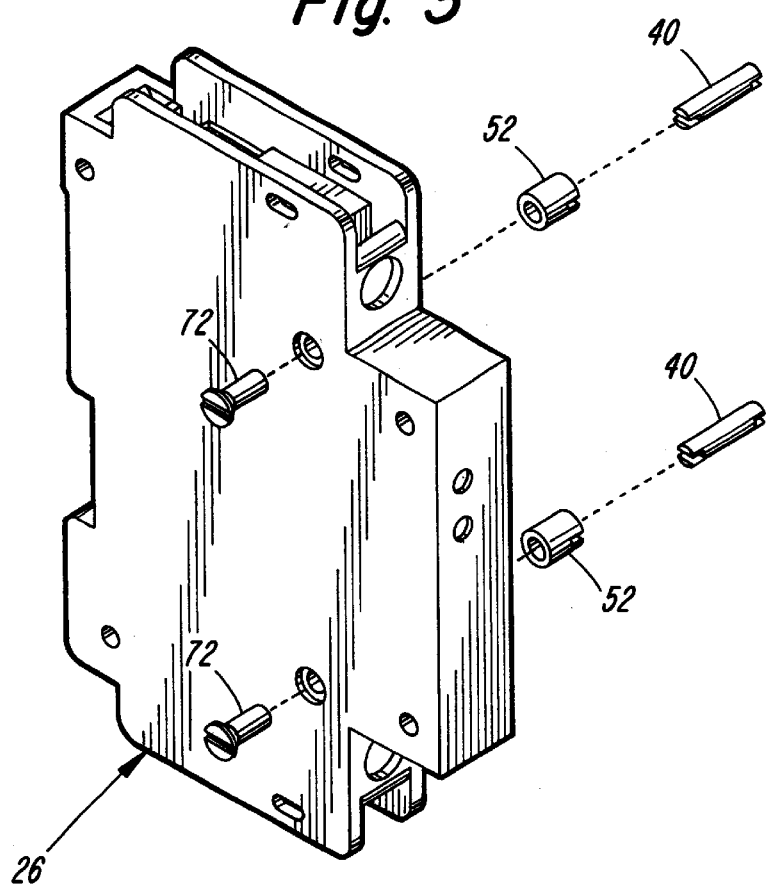
FIG. 3 is a pictorial view of the module of FIG. 2, showing an alternative method of connection of the conductors to the module.
Figure 4:
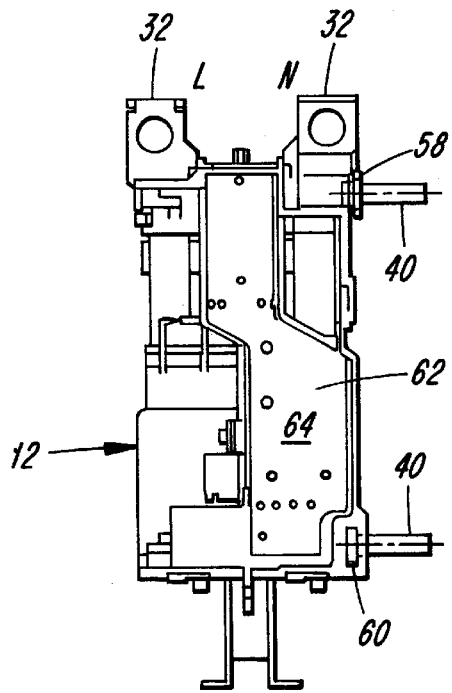
FIG. 4 is a front view of a circuit breaker module of the invention with its cover removed.
Figure 5:
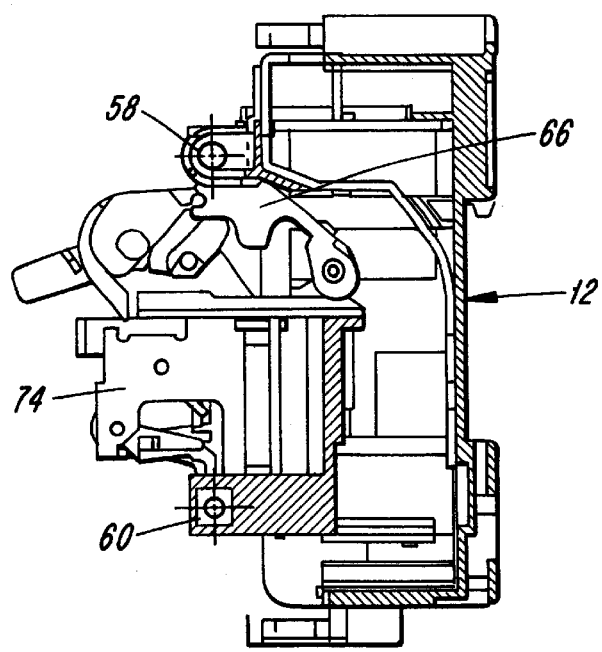
FIG. 5 is a partial sectional side view of the module of FIG. 4.

Within the body of the module 12 are a pair of contact terminals which comprise threaded receptacles 58 and 60 connected to a control circuit 62 of the module 12 (see FIGS. 4 and 5). The respective receptacles are mounted adjacent to a pair of apertures 38 formed in the side surface 34 of the housing of the module 12 (see FIGS. 4 and 5), so that conductors in the form of threaded conductive rods 40 can be screwed into engagement with the receptacles through the apertures 38 (see FIG. 3).

The ends of the conductive rods 40 have diametral slots 42 formed therein, allowing the rods to be screwed into the receptacles 58 and 60 with the aid of a screwdriver. When this is done, the rods extend transversely from the side of the module 12, in firm physical and electrical contact with the contact receptacles within the housing.

The control circuit 62 is constructed on a printed circuit board 64 and includes an input/output circuit which is able to receive signals from other modules 26 and to transmit signals to them, as well as a circuit which controls the operation of a shunt trip relay 74 arranged to cause tripping of the circuit breaker mechanism 66 of the module 12 on receipt of an appropriate control signal from a module 26.

The terminal/receptacle 58 is connected electrically to the neutral line terminal 32 of the module 12 so that the conductor 40 connected to that terminal is referenced to the neutral of the mains electricity supply, while the conductor 40 connected to the terminal/receptacle 60 serves as a data conductor. In other applications, the terminals/receptacles may be isolated from the mains supply, depending on the application of the system.

Figure 2:
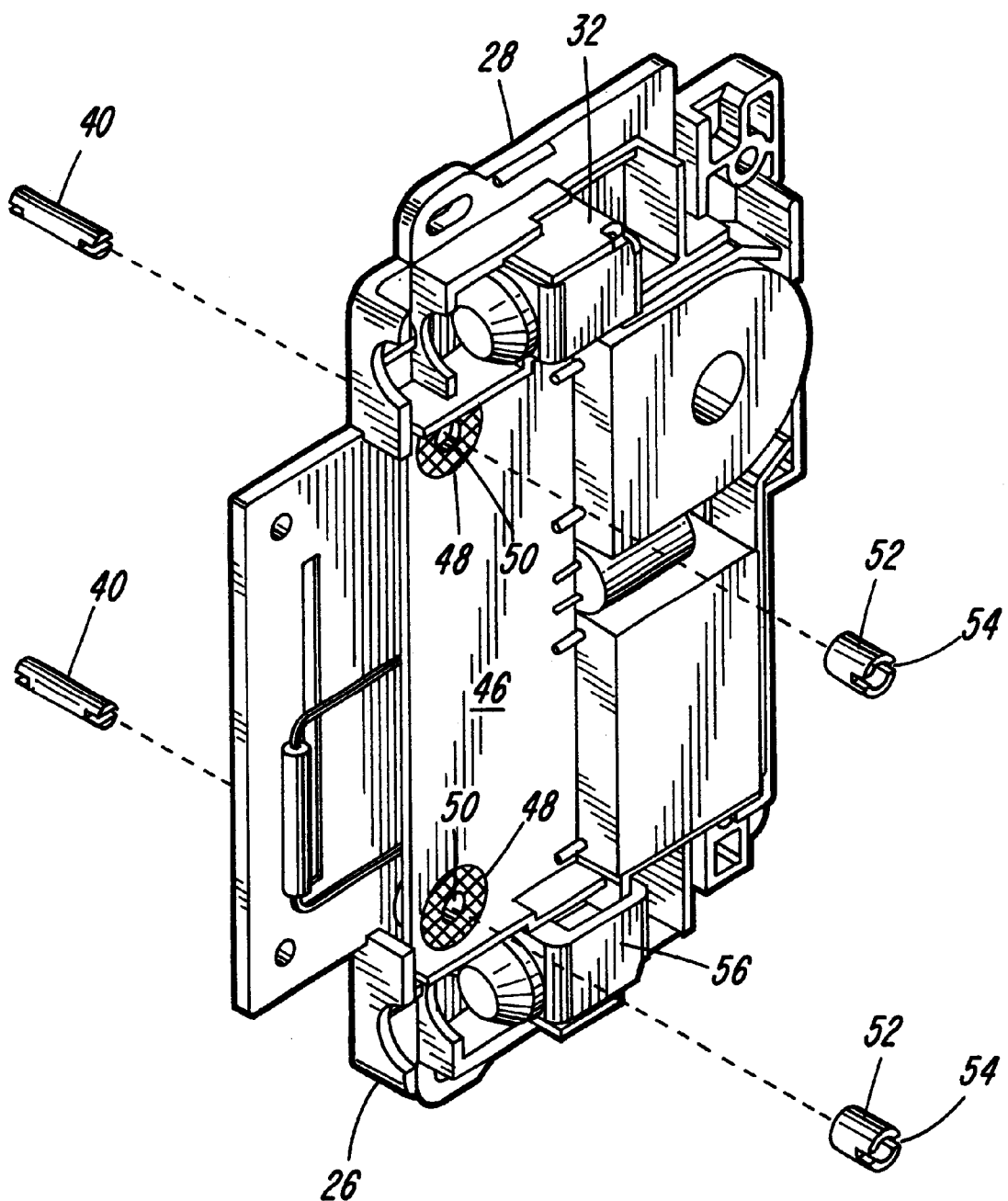
FIG. 2 is an exploded pictorial view of a portion of one of the modules of FIG. 1, showing how electrical conductors of the invention are connected thereto.

The length of the rods 40 is chosen so that when the module 26 is in abutment with the module 12, the rods screwed into the terminals/receptacles of the module 12 extend into through-bores 44 formed in the housing of the module 26. As best seen in FIG. 2, the module 26 houses a circuit board 46 which has a pair of through-hole plated contact pads 48 formed on it. The contact pads 48 have central apertures 50 therein which extend through the circuit board and which are aligned with the bores 44, so that the rods 40 extend through the apertures by a predetermined distance, typically two or three millimeters.

A pair of nuts 52 is provided, the nuts being formed from a length of metal tube threaded internally and provided with diametral slots 54 at one end thereof, allowing them to be screwed down snugly over the ends of the rods 40 until they bear against the contact pads 48, thus securing the conductor rods 40 in firm physical and electrical contact with the pads 48. The axial length of the nuts is chosen so that when they are securely in position over the ends of the rods 40, approximately half the length of the nut at the slotted end thereof is free, allowing a further set of slotted conductive rods to be screwed into the open end.

In the above way, a desired number of intermediate modules 26 can be connected together electrically, effectively defining one or more conductive buses which extend the length of the installation and which allow the transmission of data or other electrical signals between the modules. For example, where the module 26 is a kilowatt hour meter, it can transmit a control signal to the control circuit 62 of the circuit breaker module 12 causing the latter module to open its contacts if the amount or rate of electricity consumption exceeds a predetermined value.

The control circuit 62 of the module 12 can send a status or confirmatory signal back along the data conductor to the relevant module 26, so that the latter module can register that its control signal has been responded to.

The system includes a third module 76 which serves as an "end" or "cover" module and which is essentially a moulded plate which fits onto the exposed side of the last intermediate module 26, preventing access to the electrical contacts in the side thereof. This is useful both for aesthetic, safety and fraud prevention reasons.

Apertures 68 are formed in the module 76 at the upper and lower edges thereof which are aligned with corresponding apertures 70 in the module 26, allowing a security strap or wire to be passed through the holes and secured with a seal once the installation of the system has been completed. This provides an indication of tampering with the installation.

It will be appreciated that in some cases, only one transversely extending electrical conductor or bus may be required in a modular system, but two or more such busses can readily be provided. The described arrangement of the conductor components allows the various modules to be interconnected relatively quickly and easily, in a mechanically secure and reliable manner, without there being live electrical conductors exposed when not required.

Although it is likely that most installations of the invention will include a base module 12 containing a circuit breaker, it is possible that in some installations a circuit breaker is not required, and that only the intermediate modules 26 will be used. In this case, it is necessary to provide an anchor point for the conductor rods 40 in the first of the modules 26. FIG. 3 shows how this is achieved, with relatively short screws 72 being used to secure the nuts 52 in place against the contact pads of the first module 26, with additional conductor rods then being screwed into the nuts 52 as described above.

Alternatively, a version of the base module 12 can be provided which does not include a circuit breaker. For example, the base module could include a modem or other communication means, while an associated intermediate module could comprise a kWh meter. Such a combination may find use in a remote electricity metering system.

Figure 6:
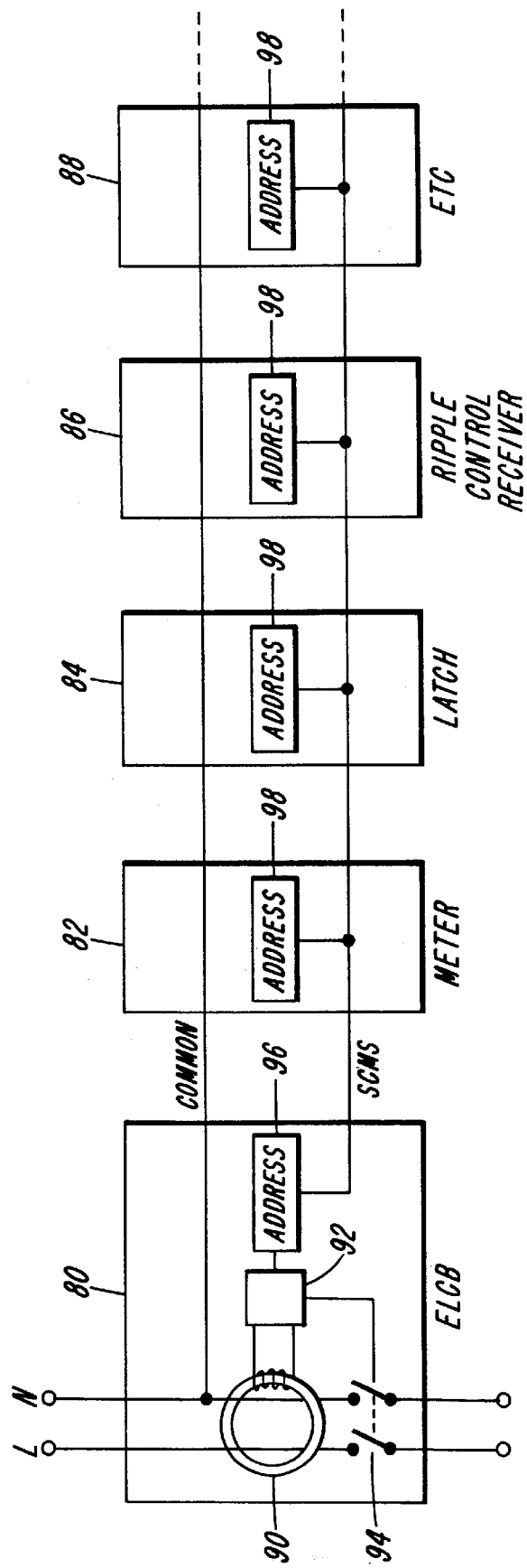
FIG. 6 is a simplified block diagram of a modular system of the invention.

FIG. 6 shows, in a highly simplified schematic form, an example of a modular circuit breaker system of the invention. The system comprises a first module 80, corresponding to the base module 12 in the above description, and a plurality of intermediate modules 82 to 88. The modules 82 to 86 are a kilowatt hour meter, a latch module and a ripple control receiver, while the module 88 is designated "ETC" to signify that it can be any other desired module. The module 80 is an earth leakage circuit breaker (ELCB) unit and has live (L) and neutral (N) input and output terminals, with the respective live and neutral conductors passing through a toroidal core 90 of an earth leakage sensing circuit 92 and passing through a pair of contacts 94 controlled by the circuit 92.

The electrical connections between the respective modules are identified as "COMMON" and "SLMS" ("single line messaging system") respectively. The COMMON line which runs between the modules is connected to the neutral conductor in the module 80, and provides a reference level in the communication system between the modules, while the SLMS line is a data or signal line on which data is transmitted between the modules.

The module 80 has a communication circuit 96, while the modules 82 to 88 have essentially identical communication circuits 98, the circuits 96 and 98 each being allocated an identity or address code so that the module 80 can identify which of the modules 82 to 88 is communicating with it, and vice versa.

The meter module 82 could be a conventional kWh meter or could be a more sophisticated pre-payment meter module. In the former case, the meter module may send a switch signal to the module 80 in the event that maximum load current exceeds a predetermined maximum threshold value, or over- or under-voltage conditions have been detected, for example. Alternatively, in the latter case, the pre-payment meter may send a switch signal both in response to an over current situation or when a pre-determined credit value stored in the meter has been used. In either case, the switch signal is transmitted on the SLMS conductor from the module 82 to the module 80 and is interpreted by the circuit 96, which in turn provides an output to the control circuit 92 to cause it to open the contacts 94. In the initial version of the system the switch signal comprised a 10 mA current signal having a duration of 30 ms. The use of current signals on the SLMS conductor is preferred, as these are relatively immune to noise and interference.

It will be appreciated that the communication scheme which is employed can be relatively simple, as described above, or can be more complex, depending on the requirements of the modules fitted. In some applications, a simpler scheme which does not support addressing may be sufficient. However, it is convenient that the described system permits communication between sophisticated electronic modules in a circuit breaker system utilising a relatively small number of robust electrical conductors.

What is claimed is:

1. A modular circuit breaker system comprising at least first and second modules mounted side by side, each of the first and second modules having a generally planar side abutting a generally planar side of the other of the first and second modules, at least one of the first and second modules including electrical terminals for connection to live and neutral conductors of an electrical supply; and at least one rigid metallic electrical conductor extending between the first and second modules and arranged to connect electrical or electronic circuitry of one of the first and second modules to electrical or electronic circuitry of the other of the first and second modules, each of the first and second module having at least one electrical contact within its housing accessible via a respective aperture in a side of its housing, the electrical conductor being engaged removably with the electrical contact in one of the first and second modules and extending transversely from the side thereof and into a respective aperture in the side of the other of the first and second modules to removably engage the electrical contact within the housing of such other module.

2. A modular circuit breaker system according to claim 1, wherein at least one of the modules includes a circuit breaker or other switching means.

3. A modular circuit breaker system according to claim 1 wherein the housing of each of the first and second modules is configured to be mounted on a mounting means.

4. A module circuit breaker system according to claim 1, wherein the conductor comprises a threaded metal rod having a first end screwed into a complementally threaded contact receptacle in the first module.

5. A modular circuit breaker system according to claim 4, wherein the second module includes a contact defining an aperture through which a second end of the threaded rod extends, the rod being maintained in electrical contact with the contact by a fastener screwed onto the second end of the rod.

6. A modular circuit breaker system according to claim 5, wherein the contact comprises a conductive pad having the aperture extending therethrough, the fastener comprising a nut bearing against the pad to connect the rod physically and electrically thereto.

7. A modular circuit breaker system according to claim 6, wherein the nut receives a first end of a further conductor screwed onto the nut.

8. A modular circuit breaker system according to claim 1, wherein the at least first and second modules includes a third module connected to the second module.

9. A modular circuit breaker system according to claim 8, wherein the third module which covers an exposed side of the adjacent second module.

10. A modular circuit breaker system according to claim 1 wherein the first module comprises a base module which includes a circuit breaker, a control circuit, and a first communication circuit; the second module comprising a second communication circuit, the first and second communication circuits communicating with one another through the at least one electrical conductor extending between the first and second modules.

11. A modular circuit breaker system according to claim 10 wherein the base module includes a circuit breaker, and a control circuit operable to open at least one set of contacts of the circuit breaker.

12. A module circuit breaker system according to claim 11, wherein the second module is arranged to transmit a switch signal to the base module, the control circuit of the base module being responsive to the switch signal to operate the circuit breaker.

13. A modular circuit breaker system according to claim 1 wherein the at least one rigid metallic electrical conductor comprises first and second electrical conductors extending between the first and second modules, the first conductor comprising a reference conductor and the second conductor comprising a signal conductor.

* * * * *